UNITED STATES PATENT OFFICE.

LEONARD B. COULTER, OF NIAGARA FALLS, NEW YORK, ASSIGNOR TO THE CARBORUNDUM COMPANY, OF NIAGARA FALLS, NEW YORK, A CORPORATION OF PENNSYLVANIA.

CRYSTALLINE FUSED ALUMINA AND METHOD OF MAKING THE SAME.

1,161,620.  Specification of Letters Patent.  Patented Nov. 23, 1915.

No Drawing.  Application filed February 24, 1915.  Serial No. 10,319.

*To all whom it may concern:*

Be it known that I, LEONARD B. COULTER, a citizen of the United States, residing at Niagara Falls, Niagara county, New York, have invented a new and useful Improvement in Crystalline Fused Alumina and Methods of Making the Same, of which the following is a full, clear, and exact description.

My invention relates to the crystalline fused alumina used for abrasive purposes in grain form, and also for making up into grinding wheels, etc.

The object of the invention is to increase the abrasive qualities of the grains or crystals as well as to increase their toughness and resistance to crushing. My invention is based upon the discovery that if such material in solid form is subjected to a temperature equal to or exceeding 1400 degrees C., the grains are improved in strength, toughness and resistance.

In carrying out my method in its preferred form, after the fused alumina from the furnace has been crushed into grain form, it is sifted roughly into sizes containing two or three consecutive numbers. These numbers indicate the number of meshes per lineal inch of the screen wire used for sifting. For example, product sifted through Nos. 16, 20 and 24 screens can be advantageously treated together. It is then subjected to the desirable temperature, preferably by passing it through a rotary kiln similar to that used for calcining cement clinker. The kiln may be fired with oil or powdered coal, and a temperature of about 1600 degrees C. to 1800 degrees C. is obtained near the lower end of the kiln adjacent to the burner. The grains descending from the upper end are preheated by the escaping gases and gradually brought up to approximately the temperature of the hot zone. They then pass out and are allowed to cool to the temperature of the air. The atmosphere of the kiln is preferably neutral, although it may be reducing or oxidizing; but it is very important that the grains be brought to a comparatively high temperature, the best results being obtained at a temperature of above 1400 degrees C. Other types of heating furnaces, such as electric furnaces, may be used for heat-treating the grains to the desired temperature.

Grains treated as above described are stronger and tougher than untreated grains, as shown both by their durability and grinding efficiency under actual work and also under well known methods of testing toughness and durability. The grains treated in accordance with my invention when viewed under a microscope appear different from the untreated product as to character of surface, distribution of coloring material, and the more or less sintering together of the grains.

As to surface character—the surfaces of the treated grains are less sharp and in places are glazed over showing that the original fractured surface had been modified by a new growth or rearrangement within the residual material. Many of the fragments are rather firmly welded together by this new growth, which is in part glassy.

As to color—the treated product is, as a whole, lighter in tone. Many grains are colorless, others blue or white and a considerable proportion are of a light brown color and but feebly translucent.

Under transmitted light, the treated product, crushed to a size of from one hundred to two hundred mesh, differs from the untreated product in showing a larger proportion of grains which are discolored light brown. Many appear to be filled with very finely divided brown or black pigments. In the others, the color is less evenly distributed, and in some cases it is confined to streaks, patches, or zones which appear to favor the margins of the individual crystals. Other grains, which, with low magnification, appear rather uniformly colored, are seen with higher magnification to contain innumerable minute black or dark particles favoring the margins in their arrangement. The treated material has a lower apparent density than the untreated material.

Without limiting myself to any theory of action, my belief is that the heat treatment above described tends to relieve strains on the individual crystals or between crystals and to adjust the molecules to a more perfect physical equilibrium. Crystalline fused alumina generally consists of from ninety to ninety-nine per cent. of alumina, the remainder, which may be designated as impurities, being principally compounds of iron, silicon, titanium and lime. Microscopic examination shows that the product consists of alumina crystals and a residual basis or material made up principally of the impurities above mentioned contained in the ore. The residual basis contains some alumina in solution. Fused alumina crystallizes with great rapidity and power into a dense and firmly knit aggregate, which sets up strains increasing in intensity as the melt cools down, particularly if the cooling is sudden. The presence of such strains is frequently indicated by anomalous optical characteristics, which are often present in artificial as well as natural crystalline alumina. Further strains result from the presence of a substance or material included in or lying about the alumina crystals, which has a different coefficient of contraction from that of the crystals.

A part of the residual interstitial material is known to be glassy in character, and in keeping with a common property of glasses, is readily subject to internal strains and particularly so since it lies between or is included in a dense rapidly solidified crystalline product like alumina. To remove the first mentioned strain, some readjustment or movement among the ultimate crystalline particles is necessary. Relief of crystal strains in the individual crystals or toward adjacent crystals is due to an adjustment toward physical equilibrium of the structure of the crystallized material itself, and with reference to the interstitial material, particularly the glass, which is itself easily affected by the high temperature.

The development of the light brown color in the heat treatment is probably due to a diffusion of the metallic constituents localized about the individual crystals along the contacts and in the grains themselves, or to a separation of the impurities originally held in solution in the $Al_2O_3$ crystals and taken up by them under conditions existing at the time of solidification, or to a decomposition or recombination of the components of the residual basis. Such recombination in the residual basis would tend to have an additional solvent action on the alumina crystals giving a coefficient of contraction more nearly equal to that of alumina. The reheating affects the small amounts of glass or other transparent interstitial matter by annealing it or causing it to crystallize into definite compounds, resulting in either case in a strengthening of the structure. The decrease in sharpness and angularity of the grains results also from the fusion of the residual basis, which allows a freer adjustment of the crystals. Fusion or softening of the residual basis also tends to unite the $Al_2O_3$ crystals composing the grain where fracture or weakness of bonding exists.

The reheating is more effective when the product is treated in the form of small fragments than in the form of the massive and unbroken ingot; and I therefore prefer to break up the material and reduce it to the size of the grain in which it is to be used before the heat treatment. In so doing, a part of the strains along the surfaces of the grains are necessarily relieved in fracture, and the grains when heated will approach more nearly a state of final equilibrium.

The improvement in toughness will be obtained with products of varying degrees of purity, but I have found that, generally speaking, the less pure the alumina, the greater the increase in toughness.

I claim:

1. As a new article of manufacture, crystalline fused alumina in the form of heat-treated grains.

2. As a new article of manufacture, crystalline fused alumina in the form of heat-treated grains or fragments having the units of structure in substantial physical equilibrium.

3. As a new article of manufacture, heat-treated crystalline fused alumina, characterized by greater toughness and resistance to crushing than the untreated material.

4. As a new article of manufacture, heat-treated crystalline fused alumina in the form of grains having glazed surfaces.

5. As a new article of manufacture, heat-treated crystalline fused alumina having its coloring material diffused through the grains to a greater extent than with the untreated material.

6. The method of treating crystalline fused alumina, consisting in heating solid material to a temperature of about 1400 degrees C. or more but below the fusion point of the alumina, and allowing it to cool.

7. The method of treating crystalline fused alumina, consisting in heating solid material to a temperature of from 1400 degrees C. to 1800 degrees C., and allowing it to cool.

8. The method of treating crystalline fused alumina, consisting in heating it while solid to a temperature which will increase the physical equilibrium of the units and will increase its toughness and resistance to crushing.

9. The method of treating crystalline fused alumina, consisting in heating it in solid condition to such a temperature as to diffuse the coloring matter and permit a readjustment of the units of structure toward a more perfect physical equilibrium.

In testimony whereof, I have hereunto set my hand.

LEONARD B. COULTER.

Witnesses:
C. S. DOUGLAS,
F. I. PIERCE.